US006430498B1

(12) United States Patent
Maruyama et al.

(10) Patent No.: US 6,430,498 B1
(45) Date of Patent: Aug. 6, 2002

(54) PORTABLE TERMINAL WITH THE FUNCTION OF WALKING NAVIGATION

(75) Inventors: Kishiko Maruyama; Shigeru Shimada, both of Kodaira; Toshiichirou Sasaki, Iwaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/613,634

(22) Filed: Jul. 11, 2000

(30) Foreign Application Priority Data

Jul. 12, 1999 (JP) ............................................. 11-197010

(51) Int. Cl.⁷ ............................................... G01C 21/00
(52) U.S. Cl. .................. 701/200; 701/201; 342/357.01; 342/357.08; 340/980
(58) Field of Search ................................ 701/200, 201, 701/202, 211, 212, 213, 214; 340/988, 995; 342/357.01, 357.06, 357.08, 443, 147; 367/118

(56) References Cited

U.S. PATENT DOCUMENTS 5,146,231 A * 9/1992 Ghaem et al. .............. 342/419
5,528,248 A * 6/1996 Sheiner et al. .............. 342/357
6,069,585 A * 5/2000 Lanciaux .................... 342/443
6,124,826 A * 9/2000 Garthwaite et al. .... 342/357.09

* cited by examiner

Primary Examiner—Yonel Beaulieu
(74) Attorney, Agent, or Firm—Mattingly, Stanger & Malur, P.C.

(57) ABSTRACT

A portable terminal has a function of walking navigation. The direction of the destination is displayed by an indicating arrow that always points in the direction of the destination. In the navigation processing, the user enters data to select a menu and/or set retrieving conditions on the setup screen. At first, the user gets the location information of the portable terminal, represented by a latitude/longitude or coordinates and an altitude, for example. Then, the user gets the direction information of the portable terminal, which is the direction of the tip of the portable terminal as determined by a compass, a gyro, or a clinometer. The location information and the direction information are set as terminal information for the retrieving conditions. The system controls retrieving of the database and retrieves the information corresponding to the selected menu, such as route guidance.

13 Claims, 10 Drawing Sheets

PORTABLE TERMINAL WITH THE FUNCTION OF WALKING NAVIGATION

BACKGROUND OF THE INVENTION

The present invention relates to a portable terminal including a portable telephone and a Personal Handyphone System (PHS)(including a telephone provided only with character data communication functions) and a personal data assistance (PDA) terminal provided with portable telephone or PHS data communication functions. More particularly, the present invention relates to a portable terminal provided with the function of walking navigation, which can supply location-related information to the walking user.

Conventionally, there have been many map information services for supplying maps and other map-related contents through the Internet and facsimile machines. In the case of those services, it is premised that information is supplied so as to be output onto such wide monitor screens of computers and printed out onto papers through facsimile machines. However, the use of PDA terminals and data communication functions of portable telephones or PHS's that are easy to carry about would make it easier for the users to obtain desired maps on sightseeing and business trips more favorably through the above services.

There are also many systems under development to be used for supplying the location information around the user's present place through the GPS (Global Positioning System). For example, a car navigation system to be mounted on a car is too large for a walker to carry around. In addition, because the navigation system premises that the system is used while the object car is running on a road, it cannot be used as a walker's navigation system as is. On the other hand, in the case of such a location information system as a PDA with GPS and a handy GPS intended to walkers, it is possible to show the user's present place on a map stored beforehand in its local memory or down-loaded from the above services.

SUMMARY OF THE INVENTION

The conventional map information services supply maps through the Internet, which are optimized on the assumption that the maps can be displayed at a resolution equivalent to that of personal computers. Consequently, they have been confronted with a problem that the maps, when displayed on small-size screen of portable telephones and PHS terminals, are not displayed clearly.

In addition, the map retrieving method employed for the above described services requires an enormous amount of cost for the communications with the server, so it is not suitable for walking navigation systems. For example, in the case of a method that narrows retrieving conditions by displaying a map in some steps of scales from a wide range to a detailed range, the map in each step must be down-loaded from the server in each of the retrieving operations. If text is entered and/or menus are selected to narrow those retrieving conditions, however, it will be possible to reduce the data communication amount during retrieving. In spite of this, the method still has some problems that if a specified place name is recorded over a plurality of pages, maps on the adjacent pages are also supplied, so that the desired map cannot be supplied directly. In such a case, the desired map will have to be retrieved by scrolling, scaling up/down the map in display. In addition, the map must be down-loaded in each of the display operations, since the map data is not accumulated beforehand in the local memory.

Furthermore, maps supplied by the above described services are not always easy for walkers to understand. For example, when a walker (user) wants to know a route from his/her present place to a destination, the route might possibly be described over a plurality of pages. Even when the route is described only on one page, the displayed range is often too wide to obtain detailed information. In order to obtain necessary information in such a case, therefore, the user is requested to make such complicated operations as scrolling, scaling up/down the displayed map, thereby the cost of communications with the server comes to be enormous as described above.

Furthermore, if the object system requires a PDA terminal in addition to the portable telephone or the PHS, users who can receive the services will be limited in number. In addition, those portable devices must be connected to each other via cable, so that it would not be easy to use them during walking. On the other hand, there are also services for supplying such information contents as movies, entertainment and business events, restaurants, etc. available with use of only a portable telephone and/or a PHS terminal. Because it is premised that the information contents are displayed on the narrow screens of those portable telephones and PHS terminals, character information is often supplied as contents. However, when the user wants to know such a spatial position as a place and a route, those services will be difficult to cope with the user's need. In addition, the portable telephone and the PHS terminal are just provided with some button keys including dialing buttons used as input devices, so they will not able to cope with inputs of complicated retrieving conditions.

On the other hand, the conventional PDA terminal with GPS and handy GPS are systems that can be used as a single unit. If they are just used to display maps stored beforehand in their local memories, they will not be a proper method to supply information matching with the user's needs and easier to understand. Also in this case, they will not be able to supply such real time information as movies, entertainment and business events, restaurants, etc. Of course, if the PDA terminal is additionally provided with data communication functions of a portable telephone and/or PHS terminal, however, it will be possible to connect them to Internet map information services only as a single unit. The above described services will not yet be easier for the users to understand.

Under such circumstances, it is an object of the present invention to provide a portable terminal with the function of walking navigation, which can supply location information easier for the user to understand during walking with use of a narrow screen of a portable telephone and/or PHS terminal. It is another object of the present invention to provide a portable terminal with the function of walking navigation, which can save labor to enter the condition for retrieving location information, as well as realize a user-friendly interface that enables the walker (user) to understand inputs of retrieving conditions intuitively.

In order to achieve the above objects, the portable terminal of the present invention with the function of walking navigation is provided with data communication, input, and display devices just like those of ordinary portable telephones and PHS terminals, as well as a device for getting location information and a device for getting direction information denoting the user's present place. Hereunder, the location information and the direction information gotten by those devices will be referred to as terminal information collectively.

Provided with those devices, the portable terminal of the present invention can use acquired terminal information as retrieving conditions, so the user can omit the input of his/her present place. The user can also specify a desired direction only by, for example, turning the tip of the portable terminal directly in the direction instead of entering such direction information as "towards the southern exit" or "along this street" when the user wants to know "what kinds of stores are there around the southern exit of the station" and/or "what kinds of stores are there on this street". Consequently, the user can save labor to enter retrieving conditions and it is possible to realize a user-friendly interface that enables the user to understand displayed items intuitively. In addition, the use of terminal information makes it possible to match a direction in an actual space with the displayed direction on the screen. For example, it is possible to compress information so as to display a direction of movement from the present place simply with an arrow. Consequently, location information can be displayed on a small-size display screen of a portable telephone and an PHS terminal so that the user can understand the displayed information easily while the information is compressed.

When using the portable terminal of the present invention with the function of walking navigation, it is expected that the following services are available.

1) "Route Guidance Service" . . . used when the user has decided a destination, but does not know how to get there.
2) "Neighborhood Guidance Service" . . . used for such information guidance as movies, entertainment and business events, restaurants, etc. when the destination is not decided yet.
3) "Meeting by Appointment Guidance Service" . . . used when meeting someone by appointment so as to notify the partner of his/her present place and/or to confirm where the partner is now.
4) "Present Place Guidance Service" . . . used to know where the walker (user) is now when he/she is lost.

To supply such services, the system is configured with a portable terminal of the present invention with the function of walking navigation respectively and a server that supplies necessary information on the Internet/intranet. Just like the Internet services available through portable telephones or PHS terminals, each portable terminal, wireless network, a gateway server, the Internet/intranet, and the application server are sequentially connected. The application server is provided with a spatial information database, a database management system, as well as a control program. The spatial information database stores maps information and such information contents as movies, entertainment and business events, restaurants, etc. The spatial information database may also be dispersed on the Internet/intranet. Each processing program compresses information to be supplied to portable terminals and controls the display on those terminals according to the terminal information. Concretely, the application server executes most of processings for walking navigation and each portable terminal is provided only with the function for displaying supplied information.

The above configuration is assumed so that such portable terminals as portable telephones and PHS terminals are low in processing capacity respectively. Portable terminals that are a little higher in processing capacity may also be employed to control the display according to the above described terminal information. In addition, entire map data may be received on such a portable terminal as a retrieving result so that the portable terminal controls all the necessary processings from compression to display of the map data according to the object terminal information. A further high performance portable terminal may be used so as to store map information beforehand in its local memory and execute all the necessary processings from retrieving to compression and display of map information. In this case, the application server retrieves only such information contents as movies, entertainment and business events, restaurants, etc. that should be supplied in real time.

Furthermore, in the portable terminal of the present invention with the function of walking navigation, location information to get is represented by a latitude/longitude or coordinates and an altitude. For example, such a wireless antenna as a GPS, a PHS, etc., as well as an infrared ray sensor is used to measure location information. The portable terminal of the present invention may also be provided with any one of the above methods for measuring a position or some possible methods combined for measuring a position. Direction information to get is a direction and/or an angle of elevation representing the leading direction of the portable terminal or the orientation of the display. For example, a compass, a gyro, such a sensor as a clinometer, etc. are used to measure a direction and/or an angle of elevation. In this case, the axis of the compass is aligned to the normal of the display and the display is kept horizontal to the ground, thereby it is possible to know the direction (east, west, south, or north) in which the vertical axis of the display is oriented. The gyro, when it is set so as to keep pointing the north, can measure both direction and angle of elevation just like when a compass is used. In addition, if both compass and clinometer are used, it is possible to get not only a direction, but also such three-dimensional direction information as an angle of elevation to the ground. Instead of those compass and clinometer, a three-dimensional gyro may also be used for the above described measurement.

These and other objects, features, and advantages of the present invention will become more apparent in view of the following detailed description of the preferred embodiments in conjunction with accompanying drawings.

DESCRIPTION OF THE PREFERRED EMBODIMENTS

Figure 1:
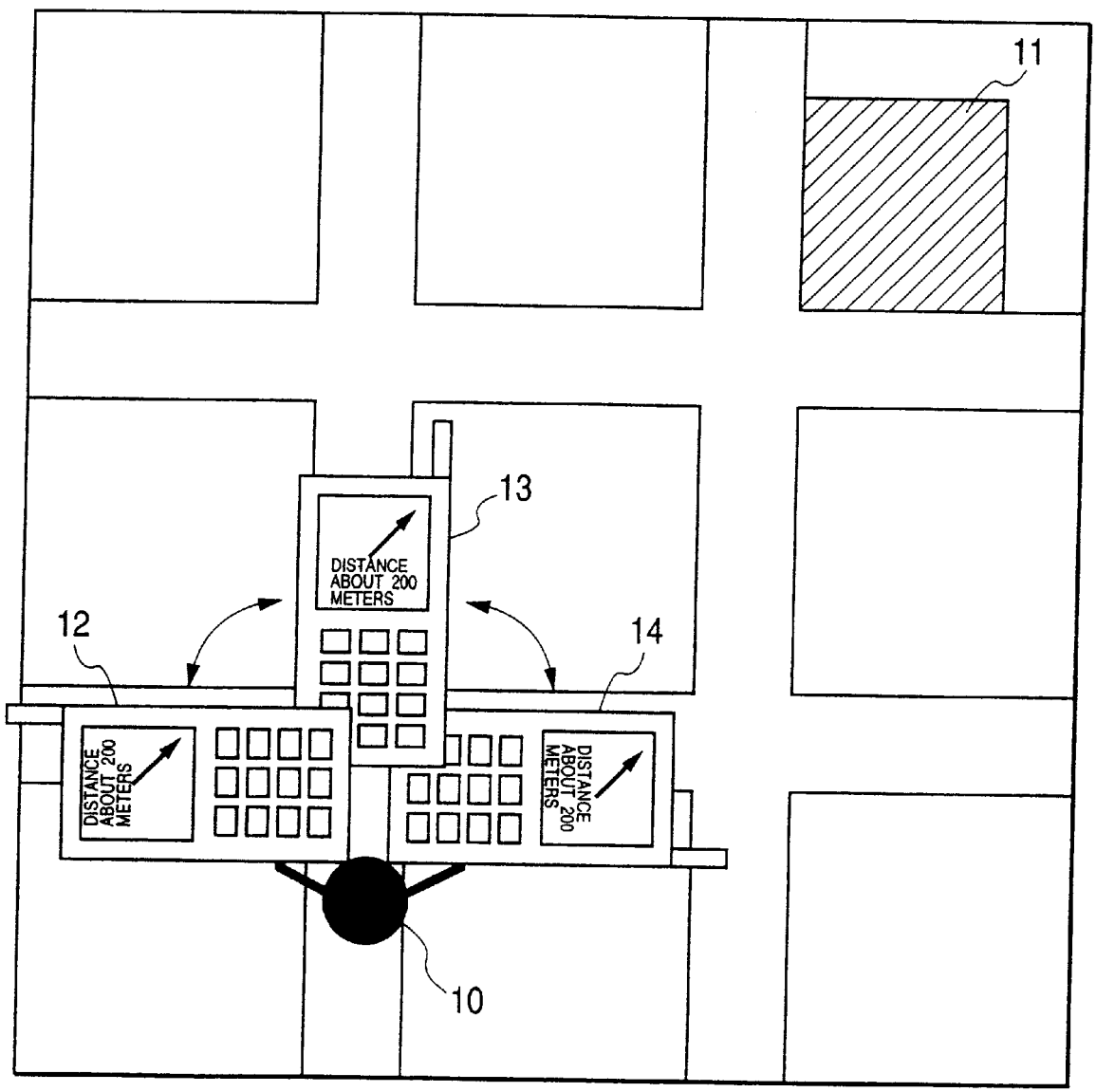
FIG. 1 is an example of display control by a portable terminal of the present invention with the function of walking navigation.

Hereunder, the preferred embodiment of the present invention will be described with reference to the accompanying drawings. FIG. 1 shows how data display is controlled by the portable terminal of the present invention with the function of walking navigation. A walker (user) 10 is walking towards a destination 11. The walker can inquire the system of the direction of his/her destination and in which direction he/she should go each time he/she is lost. According to the present invention, the system, upon such an inquiry, supplies information compressed so as to be displayed on a narrow screen of the object portable telephone and/or PHS terminal. For example, the system supplies the direction and distance to the destination from the present place with an orientation and a length of an arrow on the screen. In the case of ordinary map systems, the top side of the map on the screen denotes the north. Because walkers are usually walking unconsciously with directions, the orientation of the map must be adjusted to the direction of the actual space. Usually, the walker can know his/her present place from the landmark information written on the map. However, it is actually impossible to display such detailed information on the narrow screen to be employed for the portable terminal of the present invention. In order to solve such a problem, therefore, the present invention enables the direction of the destination in the actual space to be controlled so as to be adjusted to the orientation of the arrow displayed on the screen. If the walker 10 inquires the system of a direction by turning his/her portable terminal as shown with the compressed information item 12, 13, or 14, the screen display is controlled so that the arrow always points the direction of the destination.

Next, a description will be made for a total flow of a walking navigation processing when the portable terminal of the present invention with the function of walking navigation is used. In step 103, an input by the walker 10 is controlled so that the walker 10 enters data to select a menu and/or set retrieving conditions on the setup screen interactively with use of such an input device as a button key, a pen, a microphone, etc. of the portable terminal. In step 104, the walking navigation system, expecting that the walker 10 will repeat inquiries, holds the input state in step 103. In this processing, at first, the system determines in step 101 whether or not any state is held. If any state is held, the system reads the state in step 102. If no state is held, the system controls the input in step 103. In step 105, the system waits for an input. In step 105, three choices are prepared; Run to execute the processings in steps 106 to 111, Back to return to the setup screen in step 103, and Stop to exit the program.

Next, a description will be made for a processing flow when the walker 10 selects Run in step 105. At first, the walker 10 gets the location information of the portable terminal with use of a device in step 106. The location information of the portable terminal here is represented by a latitude/longitude or coordinates and an altitude. For example, the location information is measured with use of a Cellular antenna and such an infrared ray sensor as a GSP, PHS, or the like. Then, the walker 10 gets the direction information of the portable terminal with use of a device in step 107. The direction information is the direction of the tip of the portable terminal or the orientation of the display screen represented by a direction and an angle of elevation. For example, a compass, a gyro, and such a sensor as a clinometer are used to measure the direction information. In step 108, the walker 10 sets the location information gotten in step 106 and the direction information gotten in step 107 as terminal information for retrieving conditions. In step 109, the system controls retrieving of the database and retrieves the information corresponding to the menu selected in step 103 on the retrieving conditions set in steps 103 and 108. If the route guidance service is selected in step 103, the system retrieves information of, for example, a route between the present place and the destination. In step 110, the system controls compression of the information, which is a result of retrieving in step 109 so as to compress the information according to the terminal information set in step 108 so that it is displayed on the small screen. In step 111, the system then controls display of the information, which is a result of compression in step 110 so as to convert the information according to the terminal information set in step 108. The information is thus displayed more easily for the walker to understand. At this time, the result of retrieving may be stored as needed. Finally, the system returns to step 105 so as to wait for another input.

Next, a description will be made in detail for the portable terminal of the present invention with the function of walking navigation on the assumption of concrete services. FIG. 3 shows how information compression is controlled for the "Route Guidance Service" with use of the portable terminal of the present invention with the function of walking navigation. This service is used when the walker 10, who has decided his/her destination, does not know the route to the destination. At first, how information compression is controlled for this service will be described with reference to the processing flow shown in FIG. 2. To begin the use of this service, at first the walker is requested to select "Route Guidance Service" from the service menus in step 3. Then, the walker must set the destination with use of an input device. The destination, for example, can be set with a text input with use of button keys or a pen and/or with a voice input from a microphone. The set states in step 103 are needed each time the walker makes an inquiry, so they are held in the system in step 104. The present place is updated automatically with the location information gotten in step 106 each time the walker makes an inquiry. The first point may be registered in the system as a starting point and a passing point may be registered in the system as a middle point.

Just like in FIG. 1, FIG. 3 shows the walker 10 walking towards a destination 11. If the system receives an inquiry in a state between (a) and (f), information compression is controlled so as to be represented as compressed information items 21 to 26 in the portable terminal of the present invention with the function of walking navigation. In the case of the compressed items 21 and 22, information is compressed so that both direction of the destination and distance from the present place are represented by an orientation and a length of an arrow. The compressed information item 21 denotes a far distance to the destination and the compressed information item 22 denotes a near distance to the destination respectively.

In the case of the compressed information items 23 and 24, the direction in which the walker 10 goes around the present place is represented by a bent line and an arrow. The compressed information item 23 denotes a far distance to the next corner and the compressed information item 24 denotes a near distance to the next corner. In the case of the compressed information items 25 and 26, a full route from the starting point to the destination is represented simply by a bent line. The present place on the full route is always represented by a black circle on the bent line. Compressed information items 25 and 26 denote inquiries issued on middle points on the same route. Between 21 and 26, the map is displayed with a direction of movement from the present place at the up-side.

Compressed information items 21 and 22 can be supplied if the location information of both present place and destination is known. In step 109, therefore, it is only needed to retrieve the location information of the destination simply from the name of the destination, etc. In this case, because the location information of the destination is not changed in the same route, retrieved information is stored once and the next and subsequent processings are omitted. In the next step 110, both direction and distance to the destination from the present place are found from the location information of both present place and destination, then just represented by an arrow. On the other hand, to supply the compressed information items 23 and 24, the route information around the present place, selected from the route information between the present place and the destination is required. In step 109, therefore, the system retrieves information of the route between the present place and the destination by means of route retrieving and separates information of the route around the present place from this route information and supplies the information. In addition, to supply such compressed information items as 25 and 26, the system requires information of the route between the starting point and the destination. In step 109, therefore, the system retrieves information of the route between the starting point and the destination by means of route retrieving. In this case, because information of the route between the starting point and the destination remains the same as long as the same route is taken, retrieved information is stored. In the next step 110, the system supplies the information of the route between the starting point and the destination and the location information of the present place that are related to each other relatively.

Figure 4:
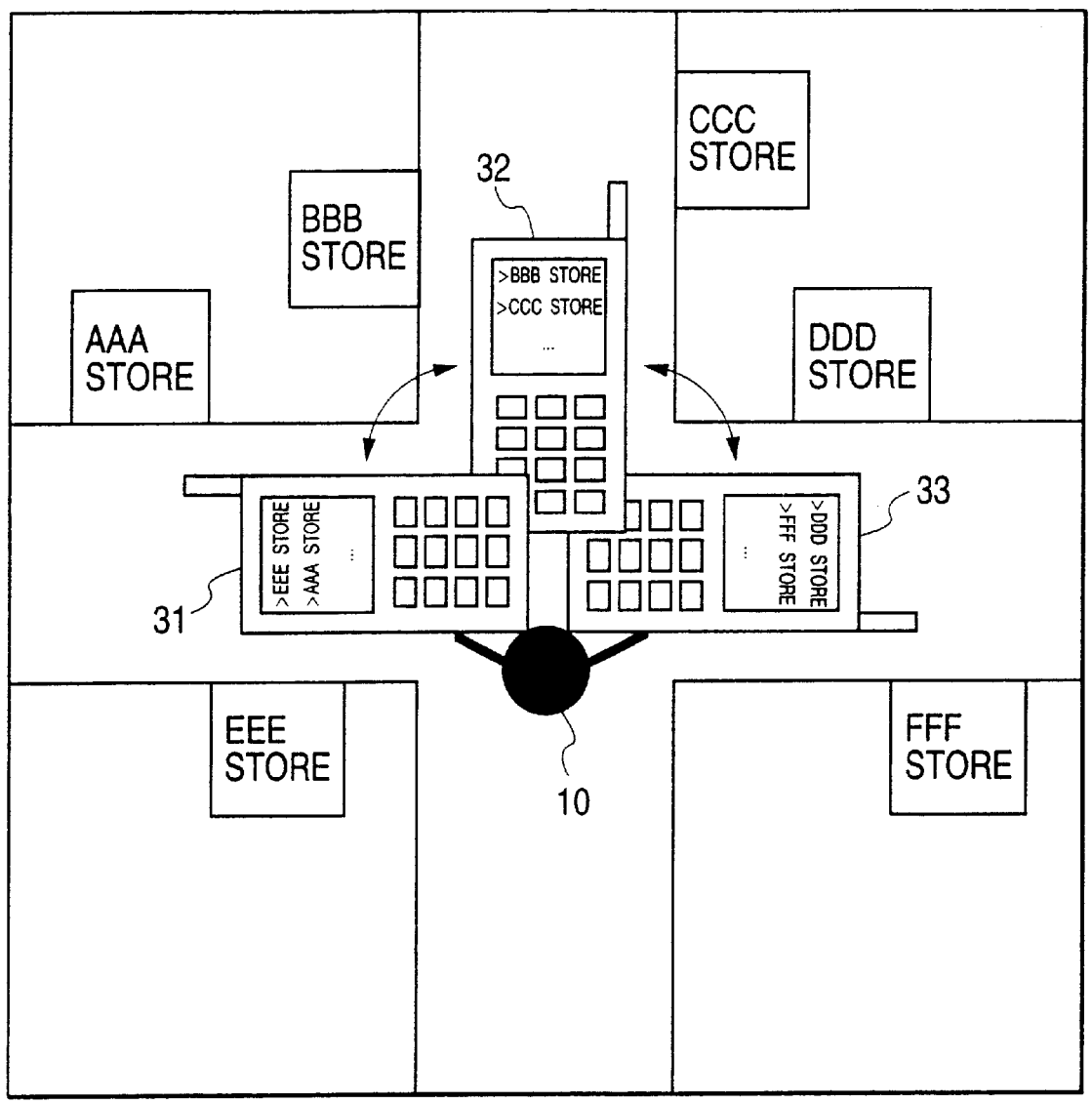
FIG. 4 shows how retrieving is controlled for the "Neighborhood Guidance Service" by the portable terminal of the present invention with the function of walking navigation.

FIG. 4 shows how retrieving is controlled for the "Neighborhood Guidance Service" with use of the portable terminal of the present invention with the function of walking navigation. This service is used when the walker does not decide his/her destination yet and wants to obtain information about movies, entertainment and business events, restaurants, etc. Hereafter, how information of the service is compressed and controlled will be described with reference to the processing flow shown in FIG. 2. At first, the walker is requested to select the "Neighborhood Guidance Service" from the service menus, then selects a category for retrieving in step 103. In the example shown in FIG. 4, the walker has selected a store as a category for retrieving. Usually, walkers who use this service do not search places around the present place conventionally, but they often want to search specific information, for example, "what kinds of stores are there around the southern exit" and "what kinds of stores are there along this street". However, it is difficult to set such complicated retrieving conditions by selecting an ordinary menu and a text input. To solve such a problem, therefore, the portable terminal of the present invention with the function of walking navigation has enabled a destination to be specified only by turning the tip of the portable terminal in the direction directly. In step 107, the system detects the orientation of the tip of the portable terminal and the orientation is set as a retrieving condition in step 108. Upon an inquiry specified by turning the tip of the portable terminal in the direction of the destination as shown with compressed information 31, 32, or 33, the portable terminal of the present invention with the function of walking navigation supplies, for example, a list of stores existing in the specified direction. The portable terminal can also be designed so as to display detailed information of each store in the list if the walker selects the store.

Figure 5:
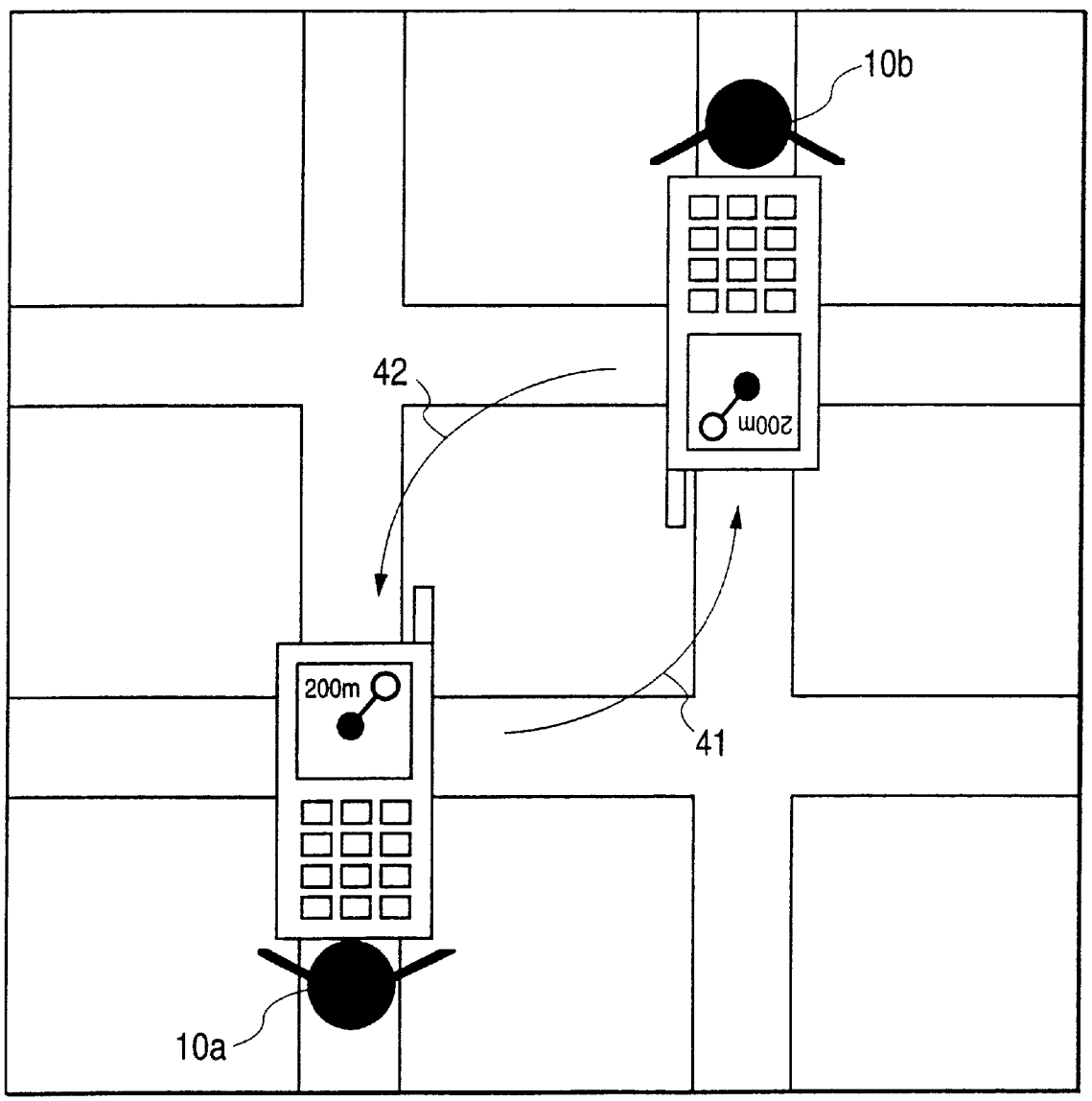
FIG. 5 shows an embodiment of the "Meeting by Appointment Guidance Service" by the portable terminal of the present invention with the function of walking navigation.
Figure 6:
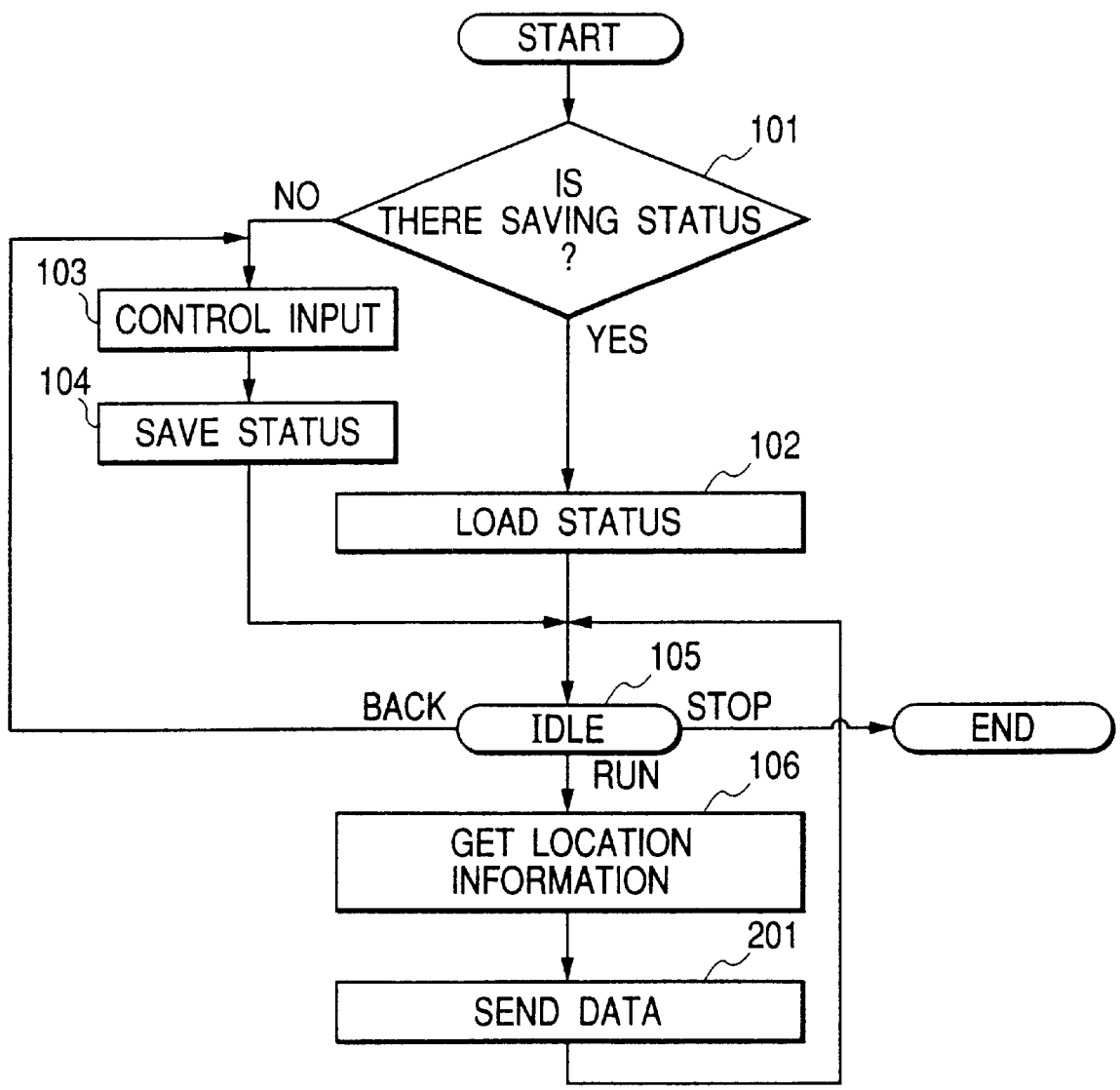
FIG. 6 is a flowchart of data sending for the "Meeting by Appointment Guidance Service".
Figure 7:
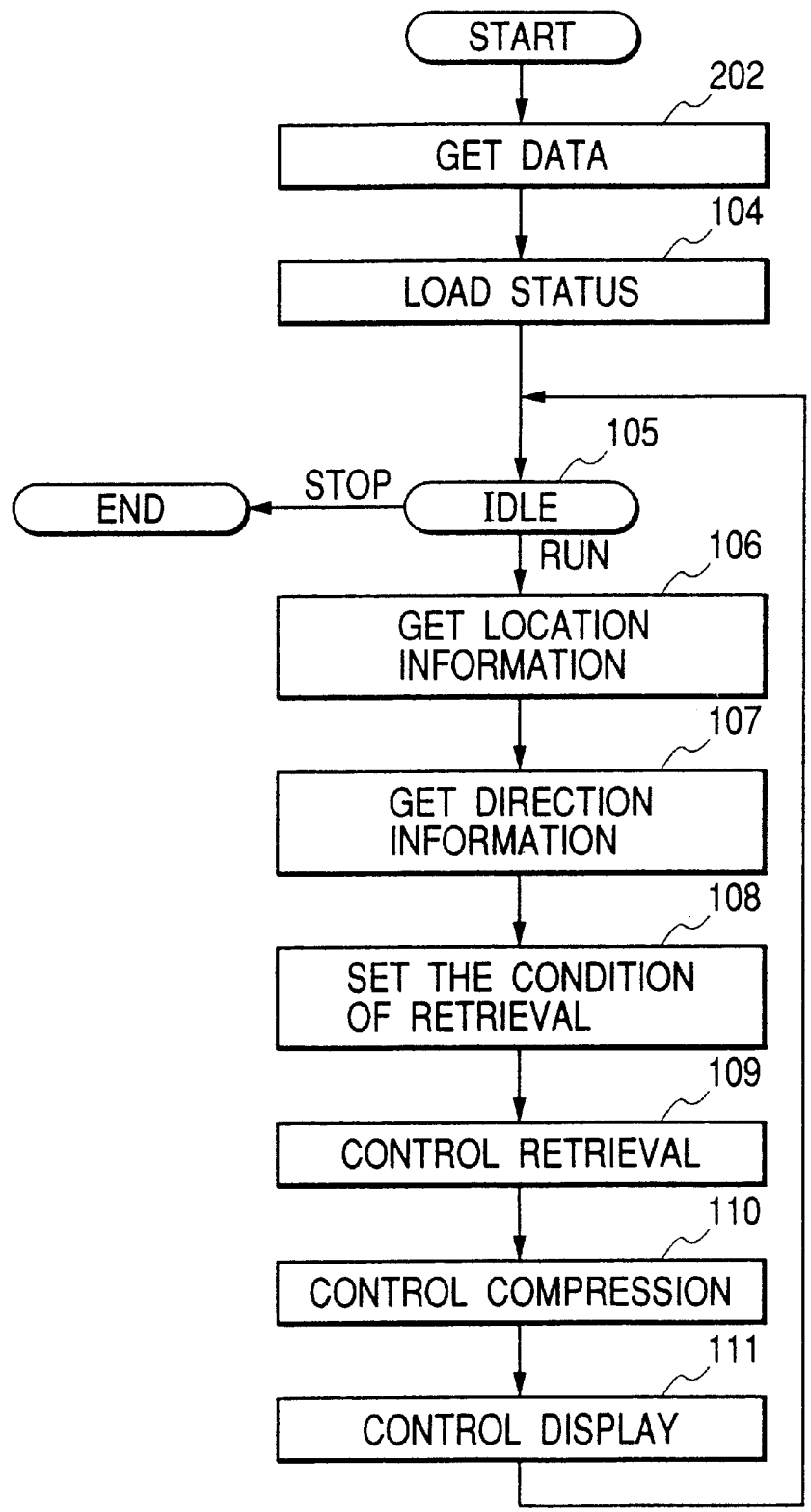
FIG. 7 is a flowchart of data receiving for the "Meeting by Appointment Guidance Service".

Next, a description will be made for an embodiment of the "Meeting by Appointment Guidance Service" with use of the portable terminal of the present invention with the function of walking navigation with reference to FIGS. 5, 6, and 7. This service is used when the user (walker), who is to meet someone by appointment, notifies his/her present place to the partner and confirm the partner's present place. In FIG. 5, 10*a* and 10*b* denote walkers who will meet each other by appointment. Compressed information items 41 and 42 denote flows of data sending/receiving to confirm their present places. In this embodiment, data may be exchanged directly between portable terminals just like the message sending function of portable telephones and PHS terminals. Otherwise, data may be exchanged via an Internet server just like the e-mail functions.

At first, the processing flow of data sending shown in FIG. 6 will be described on the assumption that the walker 10*a* notifies his/her present place to the walker 10*b*. The processings in steps 101 to 106 are identical to those shown in FIG. 2. When sending data, the walker 10*a* selects the data sending menu from the menus of this service in step 103 and sets the phone number of the walker 10*b* as the destination. In this case, if the walker 10*a* selects Run in step 105, the location information gotten in step 106 is sent to the walker 10*b* in step 201.

Figure 2:
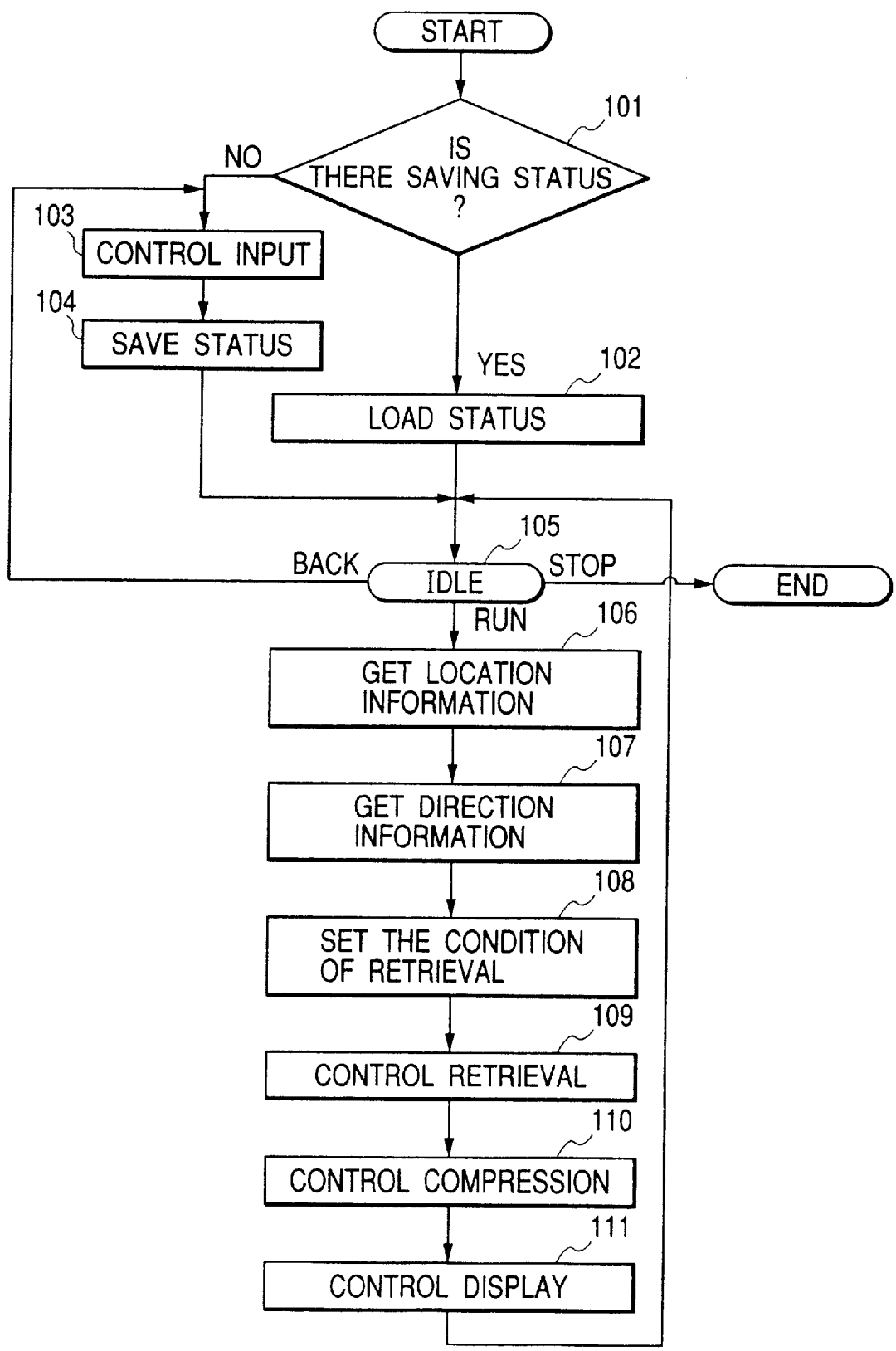
FIG. 2 shows a total flow of a walking navigation processing by the portable terminal of the present invention with the function of walking navigation.
Figure 3A:
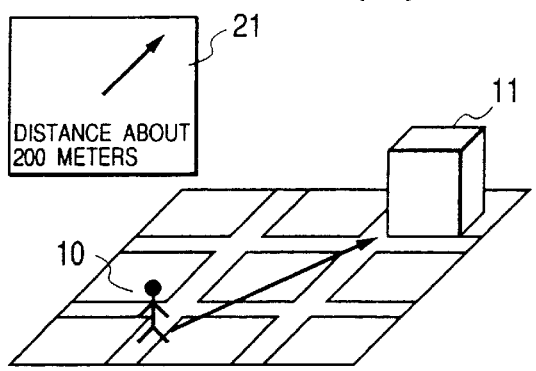
FIG. 3 shows how data compression is controlled for the "Route Guidance Service" by the portable terminal of the present invention with the function of walking navigation.
Figure 3B:
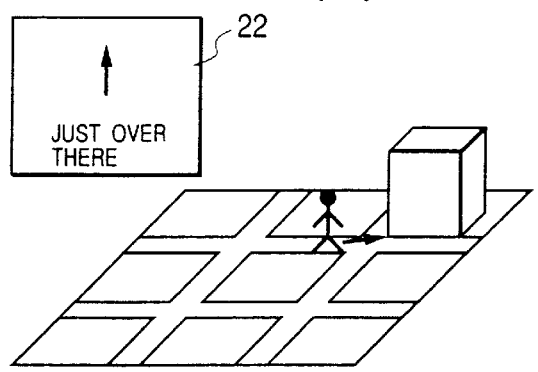
Figure 3C:
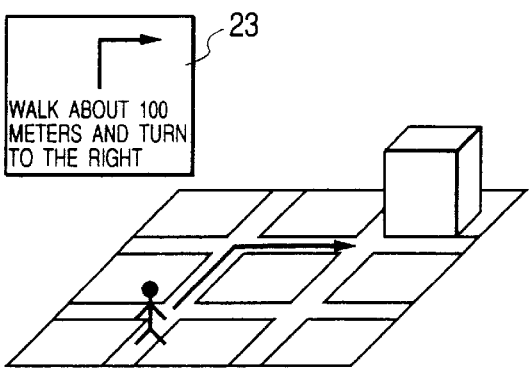
Figure 3D:
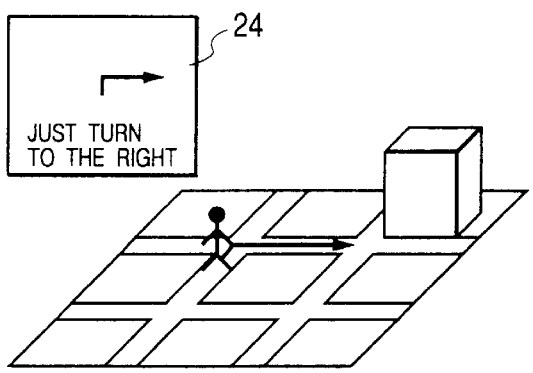
Figure 3E:
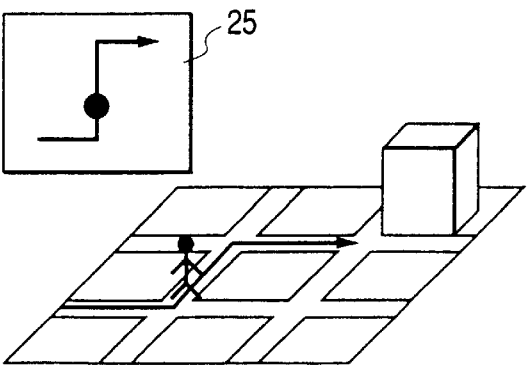
Figure 3F:
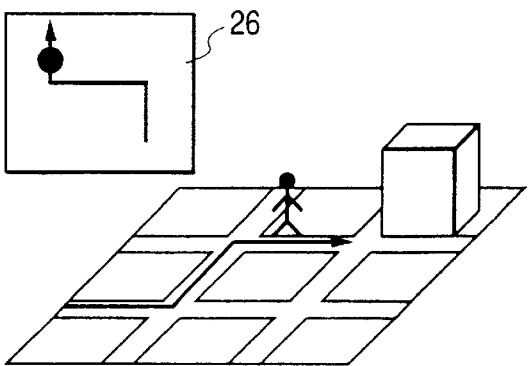

Next, the processing flow of data receiving shown in FIG. 7 will be described on the assumption that the walker 10*b* confirms the partner's present place. In step 202, if the walker 10*b* receives location information from the walker 10*a*, the phone number of the walker 10*a*, who is a source of data sending, as well as the received position information are stored as the partner's states in step 104. If the walker 10*b* selects Run in step 105, the system executes the processings in steps 106 to 111, then displays the partner's present place on the screen of the portable terminal of the walker 10*b* in step 105. The series of processings in steps 106 to 111 are the same as the processings for the "Route Guidance Service" in which the partner's present place is set as a destination. The portable terminal shown in FIG. 5 displays both direction and distance to the partner's present place (destination) from the user's present place (the present place). In this embodiment, the starting point (user's present place) of the arrow is represented by a black circle and the ending point (partner's present place) of the arrow is represented by a white circle instead of the arrow used for the "Route Guidance Service". To display the partner's present place again after Stop is selected to exit the processing in step 105, the same processing as that in FIG. 2 is executed.

Figure 8:
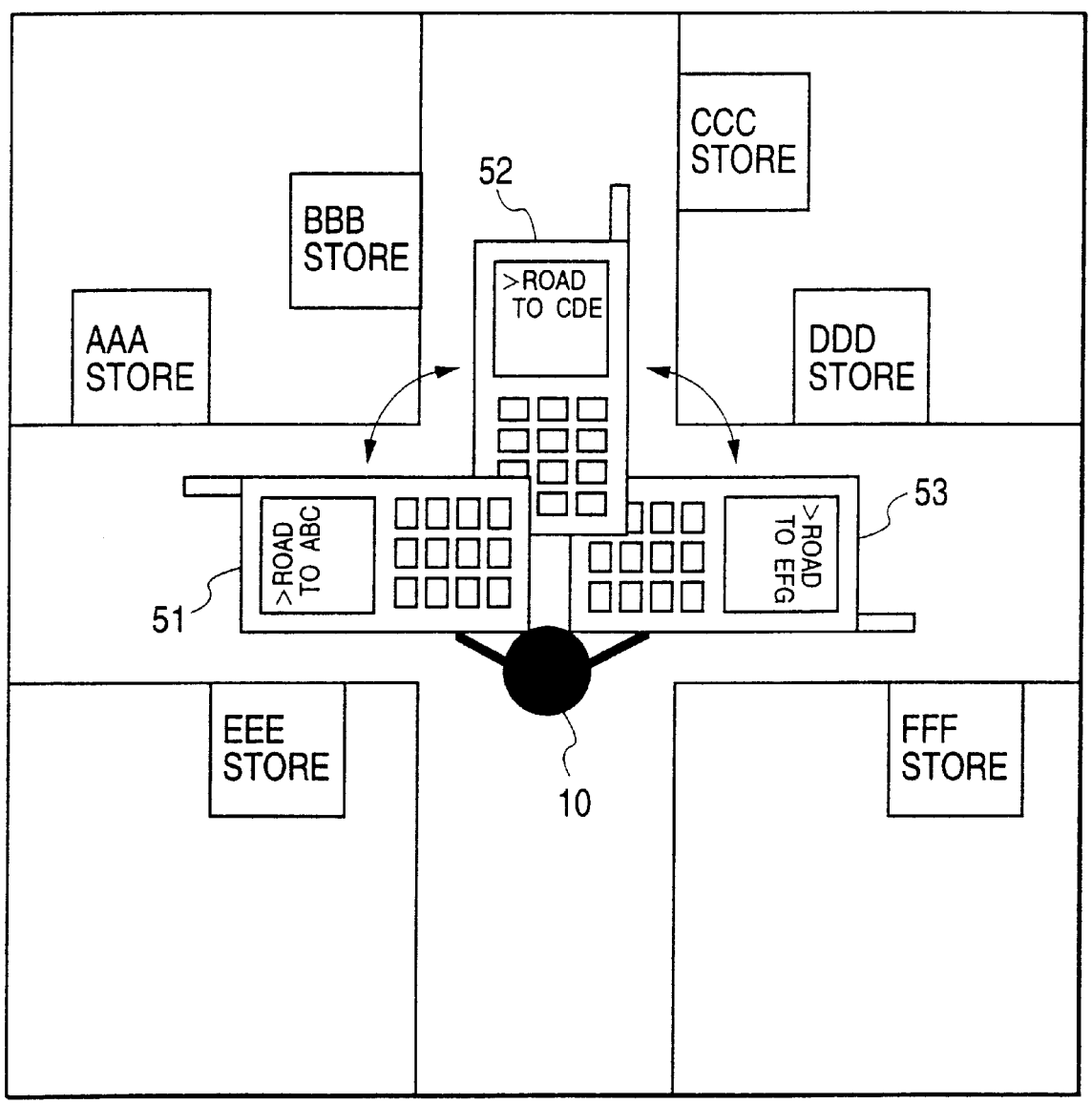
FIG. 8 shows how retrieving is controlled for the "Present Place Guidance Service" by the portable terminal of the present invention with the function of walking navigation.

FIG. 8 shows how retrieving is controlled for the "Present Place Guidance Service" with use of the portable terminal of the present invention with the function of walking navigation. This service is used to confirm where the user (walker) is now when he/she is lost. There may be services realized by the conventional technique so as to supply a map around the present place, but it would be difficult to display such a map on such a small-size screen as that of a portable telephone and/or PHS terminal. Actually, walkers often want to know specific information, for example, "what place this road leads to" and "what is that building?". They do not want to know general information around the present place. In such a case, the portable terminal of the present invention with the function of walking navigation enables a destination to be shown, for example, only by turning the tip of the portable terminal in the direction of the destination just like in the "Neighborhood Guidance Service". To enable this function, objects that the user (walker) wants to know are set beforehand by such a category as the destination of each road, the name of each building, etc. In the example shown in FIG. 8, the destination of a road is selected. If the user (walker) makes an inquiry by turning the tip of the portable terminal represented by compressed information item 51, 52, or 53, the portable terminal of the present invention with the function of walking navigation supplies information of the destination to which each road leads.

Figure 9:
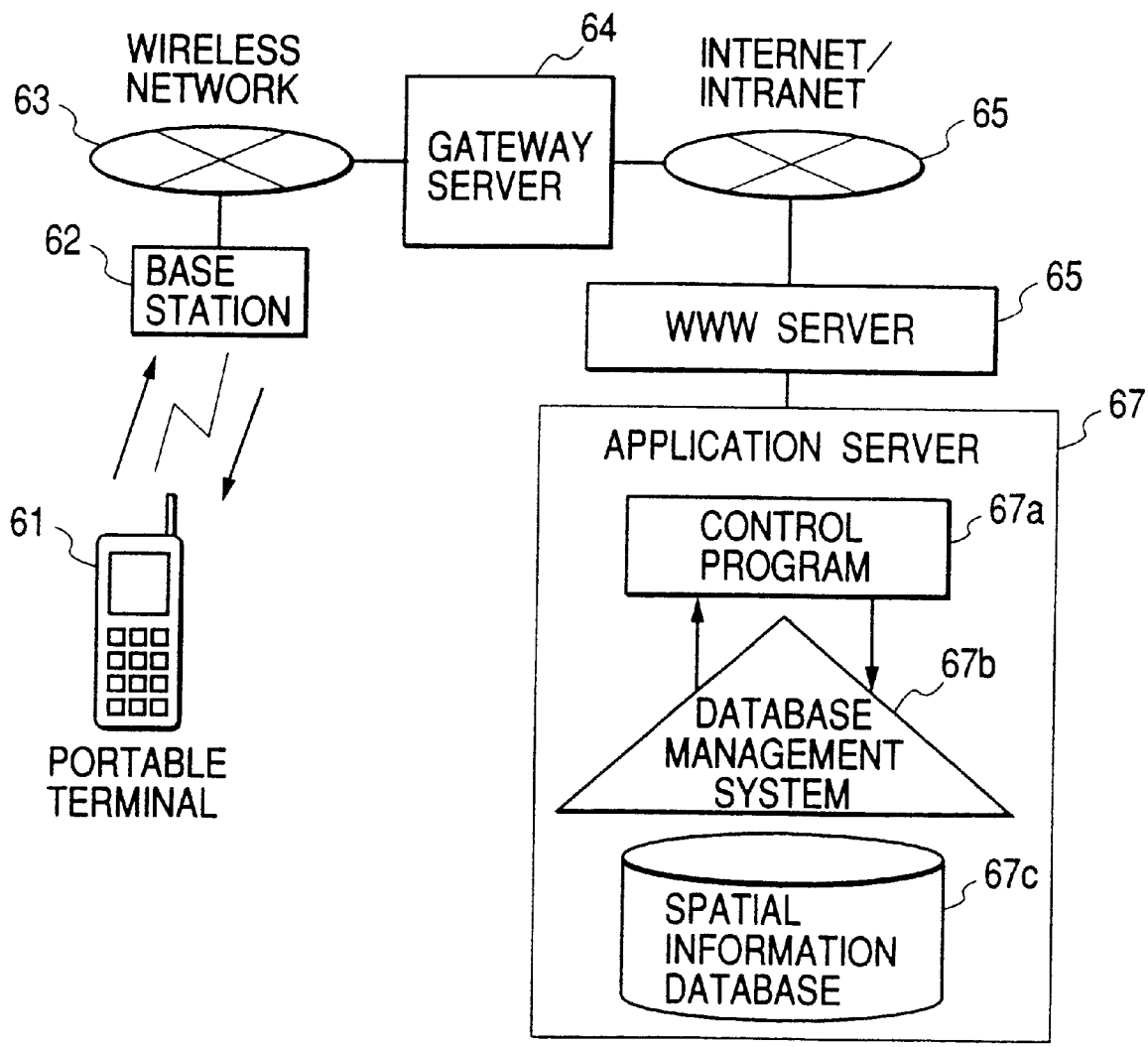
FIG. 9 is a block diagram of a walking navigation system that uses the portable terminal of the present invention with the function of walking navigation.

FIG. 9 shows a block diagram of a walking navigation system that uses the portable terminal of the present invention with the function of walking navigation. This system is composed of a portable terminal 61 and an application server 67 existing in the Internet/intranet. Just like the Internet services by a portable telephone or a PHS terminal, the portable terminal 61, a base station 62, a wireless network 63, a gateway server 64, a WWW server 66, the Internet/intranet 65, and the application server 67 are sequentially connected. The application server 67 stores a spatial information database 67c, a management system 67b used for the database 67c, and a control program 67a. This control program 67a controls a server processing of an input control in step 103, which is included in the processing steps shown in FIG. 2 and the processings from the setting of retrieving conditions in step 108 to the display in step 111. The portable terminal executes the client processing included in the input control in step 103 and the rest processings up to getting of direction information in step 107. The spatial information database 67c stores such information contents as maps information, movies, entertainment and business events, restaurants, etc. The database may be dispersed in the Internet/intranet.

Figure 10:
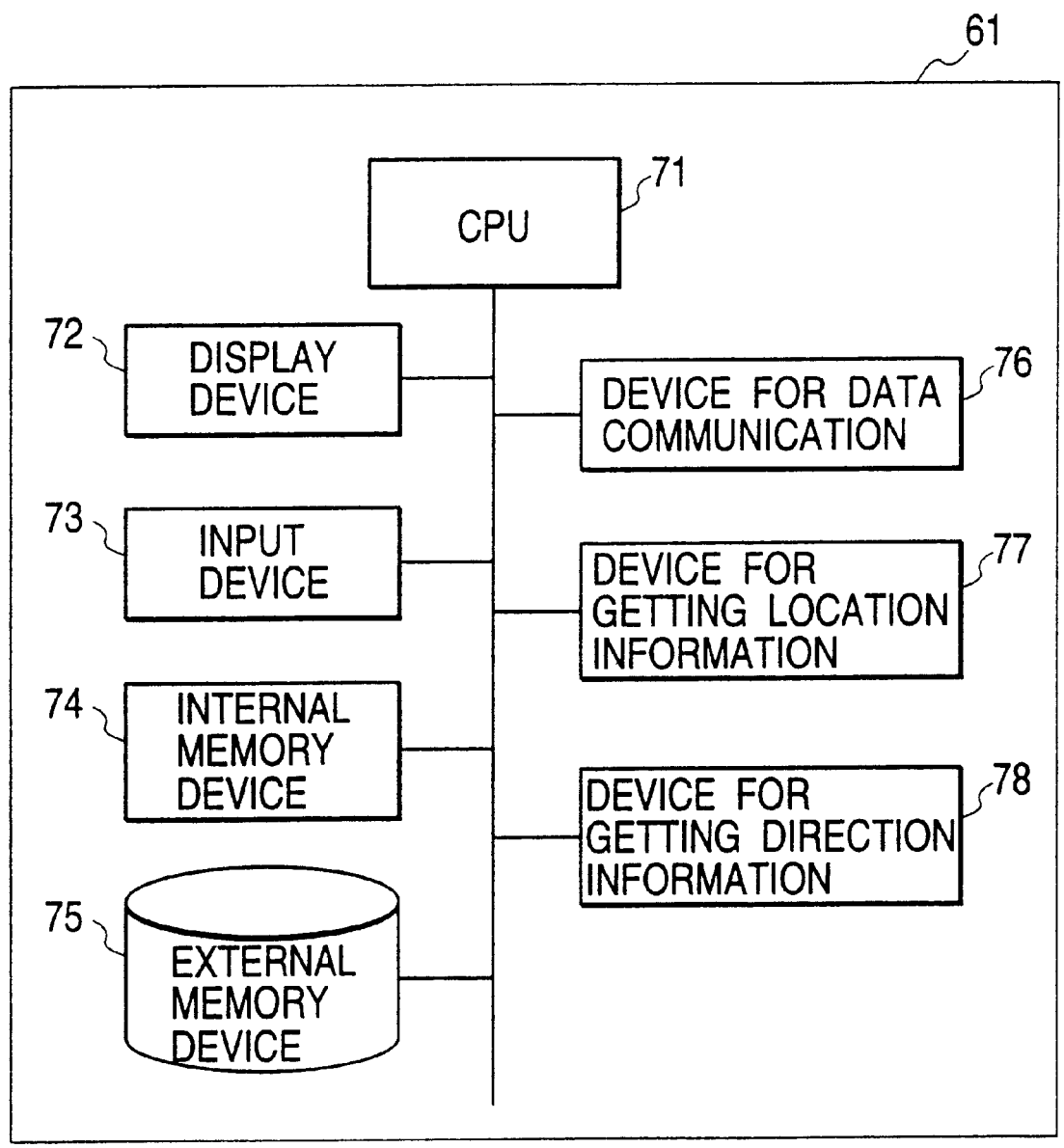
FIG. 10 is a block diagram of the portable terminal of the present invention with the function of walking navigation.

FIG. 10 shows a block diagram of the portable terminal of the present invention with the function of walking navigation. The portable terminal 61 is provided with a CPU 71, which is a control unit; such a display device 71 as a liquid crystal display or the like; an input device 72 enabling inputs of button keys, a pen, etc.; such an internal memory device 74 as a ROM, a RAM, or the like; such an external memory device 75 as a flash memory, a DVD, or the like; a device for data communication 76 of an ordinary portable telephone and a PHS terminal; a device for getting location information; and a device for getting direction information 78. Those devices are connected to each another. The device for getting location information 77 is provided with such a wireless antenna, a GPS, a PHS, or the like; such a data receiver as an infrared ray sensor, or the like; and a control unit for analyzing received data, thereby calculating location information. The device for getting direction information 78 is provided with a compass, a gyro, such a sensor as a clinometer, and a control unit for analyzing sensor-measured data, thereby calculating direction information. The device for getting location information 77 and the device for getting direction information 78 are not necessarily built in the portable terminal; they may be provided outside the portable terminal so as to be used for walking navigation.

In FIGS. 9 and 10, the portable terminal is assumed to be low in performance just like a portable telephone and a PHS, so that it is provided only with a function for displaying supplied information. The configuration is not mandatory for the present invention; a portable terminal with a slightly higher performance may be used to control the display in step 111. In addition, the portable terminal may receive the retrieving result in step 109 together with entire map data and control the compression in step 110 and the display in step 111. In addition, a further higher performance portable terminal may be used to store map information from the spatial information database 7c in an external memory device 75 beforehand, thereby retrieving map information in the retrieving control in step 109, the compression controlling in step 110, and the display controlling in step 111. In this case, the application server retrieves only such information contents as movies, entertainment and business events, restaurants, etc. that should be displayed in real time. To execute the functions of the present invention with use of a PDA terminal, it is difficult to connect the portable terminal to a portable telephone or PHS via cable. However, the portable terminal is not necessarily required to have data communication functions of a portable telephone or PHS in itself; the portable terminal may be configured so as to be connected to the portable telephone or PHS via a Cellular network.

As described above, because the portable terminal of the present invention with the function of walking navigation can use both location information and direction information obtained thereby as retrieving conditions, it is possible to save labor to enter retrieving conditions and realize a user-friendly interface that enables the walker (user) to understand condition inputs intuitively. In addition, because both compression and display of retrieving result information are controlled according to terminal information, the information can be displayed satisfactorily on a small-size screen of the portable telephone or PHS terminal, while the information is supplied so as to be easily understood.

While the present invention has been described above in conjunction with the preferred embodiments, one of ordinary skill in the art would be enabled by this disclosure to make various modifications to this embodiment and still be within the scope and spirit of the invention as defined in the appended claims.

What is claimed is:

1. A portable terminal with the function of walking navigation, comprising:
   a device for getting location information denoting a present place of said portable terminal; and
   a device for getting direction information denoting an orientation of said portable terminal,
   wherein a direction and a distance of a destination from said present place are denoted with an orientation and a length of a line that is distinguished between starting and ending points to supply route guidance information as said walking navigation information.

2. A portable terminal with the function of walking navigation according to claim 1,
   wherein said device for getting direction information gets information of a direction pointed by the tips of said portable terminal, as well as an angle of elevation.

3. A portable terminal with the function of walking navigation according to claim 1,
   wherein said device for getting direction information gets orientation information of a display of said portable terminal.

4. A portable terminal with the function of walking navigation according to claim 1,
   wherein location of a user is of said portable terminal is determined according to said location information and said direction information, and
   wherein location of partner of the user is determined according to a location information from the partner's portable terminal.

5. A portable terminal with the function of walking navigation, comprising:
   a device for getting location information denoting a present place of said portable terminal; and
   a device for getting direction information denoting an orientation of said portable terminal,
   wherein a local route around said present place is shown with a bent line and a direction of movement is shown with an arrow on said bent line to supply route guidance information as said walking navigation information.

6. The portable terminal with said function of walking navigation according to claim 5, wherein said device for getting direction information gets information of a direction pointed by the tip of said portable terminal, as well as an angle of elevation.

7. The portable terminal with said function of walking navigation according to claim 5, wherein said device for getting direction information gets orientation information of a display of said portable terminal.

8. The portable terminal with said function of walking navigation according to claim 5, wherein neighborhood guidance information is retrieved in a direction form said present place so as to supply said neighborhood guidance information as said walking navigation information.

9. The portable terminal with said function of walking navigation according to claim 5, wherein location of a user is of said portable terminal is determined according to said location information and said direction information, and wherein location of partner of the user is determined according to a location from the partner's portable terminal.

10. A portable terminal with the function of walking navigation, comprising:

a device for getting location information denoting a present place of said portable terminal; and a device for getting direction information denoting an orientation of said portable terminal, wherein location of a user is of said portable terminal is determined according to said location information and said direction information, wherein location of a partner of the user is determined according to a location information from the partner's portable terminal, and wherein a full route from said starting point to said destination is shown with a bent line that is distinguished between starting and ending points and said present place is shown with a symbol on said line to supply said route guidance information as said walking navigation information.

11. The portable terminal with said function of walking navigation according to claim 10, wherein said device for getting direction information gets information in a direction pointed by the tip of said portable terminal.

12. The portable terminal with said function of walking navigation according to claim 10, wherein said device for getting direction information gets information of a direction pointed by the tip of said portable terminal, as well as an angle of elevation.

13. The portable terminal with said function of walking navigation according to claim 10, wherein said device for getting direction information gets orientation information of a display of said portable terminal.

* * * * *